(12) United States Patent
Baumann

(10) Patent No.: US 8,439,061 B2
(45) Date of Patent: May 14, 2013

(54) EMERGENCY RAM AIR INLET VALVE OF AN AIRCRAFT

(75) Inventor: Joerg Baumann, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1060 days.

(21) Appl. No.: 12/093,008

(22) PCT Filed: Oct. 25, 2006

(86) PCT No.: PCT/EP2006/010289
§ 371 (c)(1),
(2), (4) Date: May 8, 2008

(87) PCT Pub. No.: WO2007/054206
PCT Pub. Date: May 18, 2007

(65) Prior Publication Data
US 2008/0315043 A1 Dec. 25, 2008

(30) Foreign Application Priority Data
Nov. 10, 2005 (DE) .......................... 10 2005 053 696

(51) Int. Cl.
*F02K 99/00* (2009.01)
*B64D 33/02* (2006.01)
*B64D 13/00* (2006.01)
*B64D 13/02* (2006.01)

(52) U.S. Cl.
USPC ..... 137/15.1; 137/15.2; 244/53 B; 244/118.5; 454/71; 454/76

(58) Field of Classification Search ................. 137/15.1, 137/15.2; 244/53 B; 454/71–77
See application file for complete search history.

(56) References Cited

U.S. PATENT DOCUMENTS

| | | | | |
|---|---|---|---|---|
| 3,045,983 A | * | 7/1962 | Best | 165/235 |
| 3,101,918 A | | 8/1963 | Evelyn et al. | |
| 3,375,771 A | * | 4/1968 | Balcom, Jr. | 454/74 |
| 4,130,051 A | * | 12/1978 | Brudnicki | 454/73 |
| 4,262,495 A | * | 4/1981 | Gupta et al. | 62/402 |
| 5,516,330 A | * | 5/1996 | Dechow et al. | 454/74 |
| 5,695,396 A | * | 12/1997 | Markwart et al. | 454/76 |
| 6,306,032 B1 | * | 10/2001 | Scheffler et al. | 454/71 |

(Continued)

FOREIGN PATENT DOCUMENTS

| | | |
|---|---|---|
| DE | 10145687 | 4/2003 |
| DE | 10361644 | 8/2005 |

(Continued)

OTHER PUBLICATIONS

English Translation of Abstract for SU1200533.

(Continued)

*Primary Examiner* — Ehud Gartenberg
*Assistant Examiner* — Arun Goyal
(74) *Attorney, Agent, or Firm* — Wood, Herron & Evans, LLP

(57) ABSTRACT

The present invention relates to an emergency ram air inlet valve, also designated as an ERAI valve, of an aircraft. The valve includes an actuating element for opening and/or closing the valve and a controller operatively coupled to the valve, by which the valve can be set at different open angles. The open angle is set as a function of a temperature prevailing or preset in the aircraft cabin.

12 Claims, 2 Drawing Sheets

U.S. PATENT DOCUMENTS

| | | | |
|---|---|---|---|
| 6,634,597 B2 * | 10/2003 | Johnson et al. | 244/118.5 |
| 6,681,592 B1 * | 1/2004 | Lents et al. | 62/401 |
| 6,704,625 B2 * | 3/2004 | Albero et al. | 701/3 |
| 6,945,278 B2 * | 9/2005 | Bunn et al. | 137/899.2 |
| 7,014,144 B2 * | 3/2006 | Hein et al. | 244/53 B |
| 7,469,545 B2 * | 12/2008 | Riley | 60/794 |

FOREIGN PATENT DOCUMENTS

| | | |
|---|---|---|
| EP | 1327581 | 7/2003 |
| RU | 2170192 | 7/2001 |
| RU | 1200533 | 4/2005 |
| SU | 828606 | 3/1984 |

OTHER PUBLICATIONS

English Translation of Abstract for SU828606.
English Translation of Decision on Granting a Patent for Invention, The Federal Service for Intellectual Property, Patents and Trademarks (Rospatent), RU Patent Office, Sep. 29, 2009.
International Search Report, PCT Form Nos. PCT/ISA/220 (Notification of Transmittal), PCT/ISA/210 (International Search Report), and PCT/ISA/237 (Written Opinion).

* cited by examiner

EMERGENCY RAM AIR INLET VALVE OF AN AIRCRAFT

TECHNICAL FIELD

The present invention relates to an emergency ram air inlet valve of an aircraft having an actuating element for opening and/or closing the valve. The ram air inlet valve is designated below as an ERAI valve.

BACKGROUND

In passenger aircrafts of older design, if the air-conditioning system fails completely, the pilot has to lower the flying altitude from, for example, 30,000 feet to 10,000 feet on long-haul flights, and open a window in the aircraft's cockpit, in order thus to supply the passengers in the cabin with fresh air. Aircraft of more recent design have a so-called emergency ram air inlet (ERAI), consisting of a valve in the wing box under the aircraft fuselage. In aircrafts with an ERAI valve, in such an emergency situation the pilot can actuate a push-button in the cockpit, whereupon the ERAI valve in the aircraft fuselage opens and fresh air can flow into the passenger cabin. In order to be able to supply the passengers with sufficient fresh air when the aircraft is fully occupied, the size of the valve and the opening angle of the ERAI valve are configured accordingly. The ERAI valve is fully opened in an emergency situation and otherwise kept closed.

FIG. 1 shows the prior art with the ERAI valve 1 actuated by a push-button 12, for example. Accordingly, the valve is either "fully closed (1')" or "fully open (1")".

On long-haul flights, for example over the polar regions, at a flying altitude of 10,000 feet, the outside air temperature can easily be as low as minus 38° C. If the pilot has to change the flying altitude to this altitude owing to complete failure of the air-conditioning system, and if a conventional ERAI valve is used, the cabin temperature may drop to 0° C. or lower, which may present a serious danger to the health for at least some of the passengers, as the flight at an altitude of 10,000 feet may possibly last several hours. It should also be assumed that in such an emergency situation, passengers do not have access to appropriately warm clothing or the supply of blankets to passengers is inadequate. Owing to the consequences to health then to be expected or the refunds claimed by the passengers concerned, an airline would have to reckon on considerable financial claims, which again should be avoided. The object of the present invention is therefore to provide an improved ERAI valve of the previously mentioned type, with which the aforementioned problem no longer occurs.

SUMMARY OF THE INVENTION

This object is achieved by an ERAI valve of an aircraft with the features described below. To achieve the above-mentioned object the invention provides a controller which is operatively coupled to the valve, by which the valve can be set at different opening angles, and that the opening angle ($\alpha$) is set as a function of a temperature prevailing or preset in the aircraft cabin.

According to the invention different opening or dosing positions of the ERAI valve result depending on the temperature prevailing in the aircraft cabin. The amount of fresh air determined by the opening angle of the valve at the given valve size and applied to the aircraft cabin can thus be adapted to the cabin layout and the actual number of passengers. Cabin temperatures during a flight with opened ERAI valve, above all in cold environmental conditions, such as, for example, over the polar regions, can therefore be configured as far more tolerable. The solution according to the invention further requires no great structural changes where the aircraft is concerned, since already existing components, such as, for example, an already existing ERAI valve, electrical lines, an actuating element in the cockpit, can continue to be used.

According to a preferred embodiment of the invention the opening angle of the valve can be set in steps and/or continuously. In this way the amount of fresh air supplied to the cabin area can be very precisely regulated, which in turn simplifies the precise setting of a desired cabin temperature.

In a preferred embodiment of the invention the controller is electrically connected to an actuator, by which the opening angle of the valve can be set. The controller forwards a control signal to an actuator, which causes opening of the valve to an angle corresponding to the control signal. Depending on the type of controller used, the actuator sometimes has to be adapted. This enables quick elimination of a system error in the event of a defective controller, as only the controller, but not the actuator, has to be replaced.

In a further development of the solution according to the invention the actuator is enabled by the actuating element. The actuating element is normally located in the cockpit of the aircraft and is actuated in an emergency by the pilot only after the correct flying altitude has been reached. Thus, the controller cannot open the valve before reaching the correct flying altitude, representing a considerable advantage in relation to flight safety.

The actuator is preferably a mechanical actuator, e.g. a reverse actuator. A mechanical or reverse actuator allows very reliable setting of the opening angle of the ERAI valve, uninfluenced by possibly existing interfering signals, transmitted by, e.g., electronic equipment on board the aircraft. For example, the reverse actuator is configured to translate in either direction based on an input control signal.

With regard to automatic setting of the opening angle of the valve, the ERAI valve according to the invention provides a closed-loop control circuit, which automatically sets the opening angle of the valve as a function of a temperature prevailing or preset in the aircraft cabin. This temperature should be such that no serious danger to the health of the aircraft passengers is imposed, above all in case of a longer flight time, during such an emergency situation. By automatic closed-loop control of the opening angle of the valve by means of the control circuit as a function of the temperature prevailing or preset in the aircraft cabin, maximum comfort of the passengers on board an aircraft which has arrived at an emergency situation is ensured.

According to a preferred further development of the invention, in addition to the controller, the control circuit contains a temperature sensor arranged in the aircraft cabin, an opening angle indicator and the actuator. With a control circuit of this kind, the actuating element and the temperature sensor arranged in the aircraft cabin send appropriate signals to the controller, which then emits a signal to the actuator, for example a reverse actuator. The reverse actuator is in turn coupled to the opening angle indicator which sends a signal corresponding to the opening angle of the valve to the controller. This closes the closed-loop control circuit. A control circuit of this kind ensures that the opening angle of the valve is constantly readjusted as a function of the temperature detected by the temperature sensor in the aircraft cabin or a preset temperature. This substantially eliminates the danger of too steep a drop in the temperature in the aircraft cabin.

According to a further development of the solution according to the invention, in addition to the already existing controller, a manual controller, which is preferably an operating lever, is provided in the aircraft cabin and/or in the cockpit. The operating lever is, for example, a toggle switch, slider or rotary control. Operating levers of this kind are commercially available and easy to mount in the passenger area or cockpit of the aircraft, so hardly any increased costs arise for the aircraft manufacturer in mounting the manual controller. A manual operating lever of this kind offers an additional intervention option for the pilot and/or the aircraft personnel for setting the opening angle of the valve manually if the cabin temperature resulting from the current valve setting does not correspond to the desired level. The manual operating lever further enables manual correction of the opening angle of the valve in the event of failure of one of the components of the control circuit, e.g. the temperature sensor present in the aircraft cabin.

In order to give the pilot or the aircraft personnel feedback on the opening angle of the valve, a further development of the invention provides that the position of the operating lever is proportional to the opening angle of the valve. This guarantees is that the person who actuates the operating lever at the same time obtains knowledge of the respective opening angle of the valve.

In a preferred configuration of the invention, the actuating element is a push-button arranged in the cockpit of the aircraft. A push-button of this kind is easy for the pilot to operate, without the pilot's attention being diverted from the other monitoring instruments in the cockpit. The result of this is that the pilot is the highest authority who activates the entire ERAI valve.

BRIEF DESCRIPTION OF THE DRAWINGS

The invention is explained below by way of example using the attached schematic figures.

DETAILED DESCRIPTION

Figure 1:
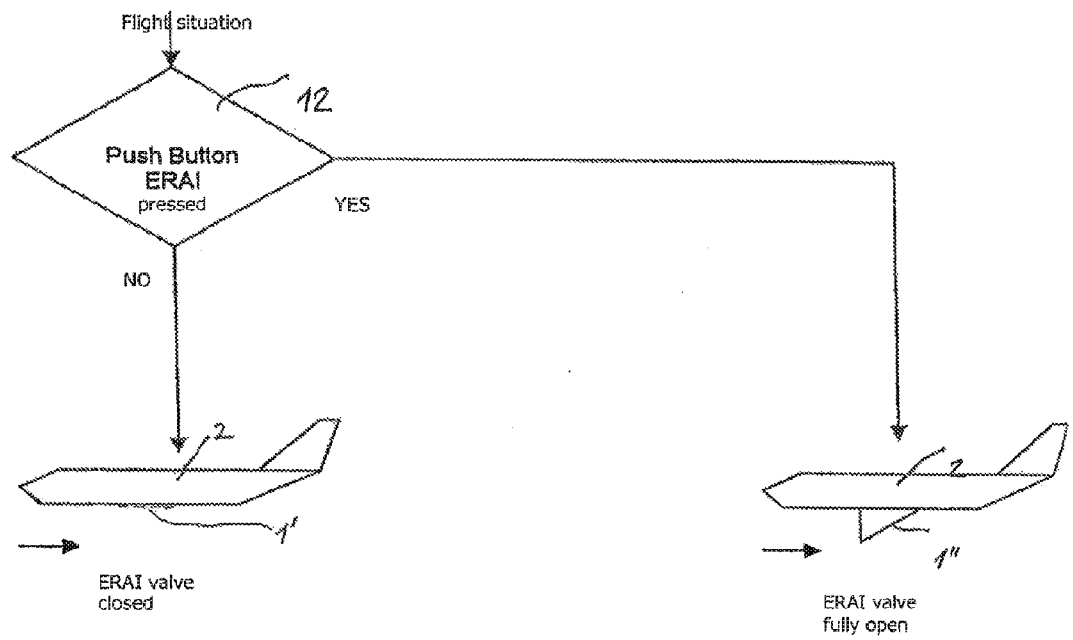
FIG. 1 represents the prior art on actuation of the ERAI valve.
Figure 2:
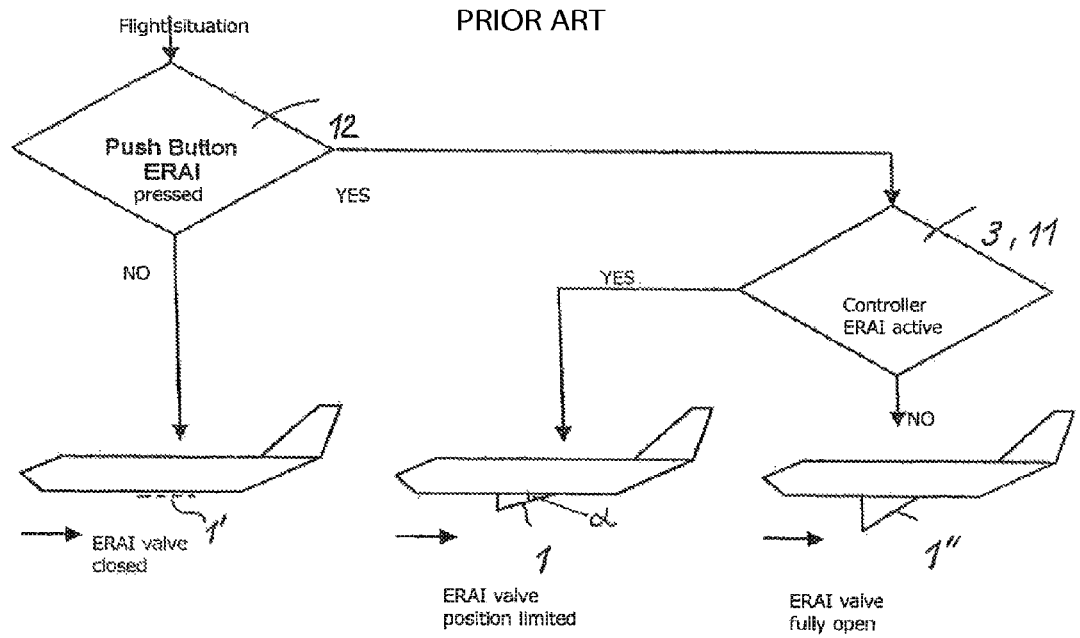
FIG. 2 represents a schematic illustration of a circuit diagram of the solution according to the invention.

FIG. 2 shows a schematic illustration of a circuit diagram of an ERAI valve according to the invention. If the pilot of a passenger aircraft identifies complete failure of the air-conditioning system of the aircraft, the pilot has two options. If the switch or push-button 12 located in the cockpit of the aircraft is not pressed by the pilot, the ERAI valve remains closed (left-hand situation in FIG. 2). If, though, the pilot has pressed the push-button with the intention of supplying the passengers in the aircraft cabin with fresh air, a control signal is sent to a controller or control device 3, 11. The controller 3, 11 in turn activates the actuator which effects opening of the ERAI valve. If, for example, the controller 3, 11 is coupled to a temperature sensor located in the aircraft cabin, and if the cabin temperature detected by the temperature sensor continues to be in a range tolerable to the passengers, the controller 3, 11 causes complete opening of the ERAI valve 1 by the actuator (right-hand situation in FIG. 2). If the cabin temperature has already fallen below a desired temperature, the controller 3, 11 causes the ERAI valve to be opened only to a particular opening angle α (center situation in FIG. 2).

In FIG. 2, the fully closed valve position is shown by reference numeral 1', while reference numeral 1" indicates a fully opened valve position (e.g., with the valve disposed outside the aircraft to act as a ram air inlet), and reference numeral 1 refers to a valve opening angle α, which is between the fully closed position 1' and the fully open position 1".

In the aforementioned way, a tolerable temperature level is ensured in the cabin 2, which can be adapted to the number of passengers present and the cabin layout. If, for example, the cabin 2 is fully occupied, the ERAI valve 1 is opened to a larger opening angle α than in the case with fewer passengers.

Figure 3:
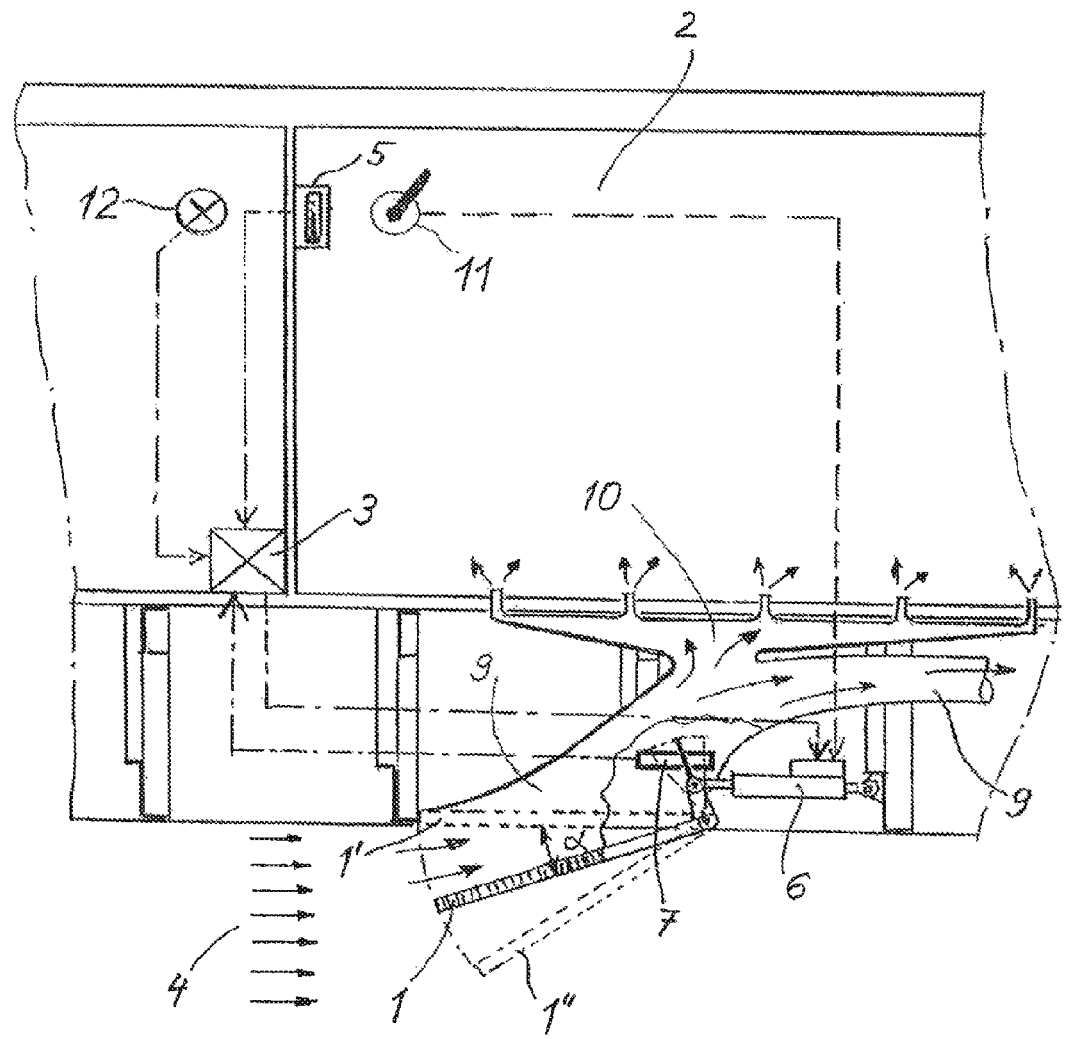
FIG. 3 represents a schematic illustration of the components of two embodiments according to the invention.

FIG. 3 shows a schematic illustration of the components of two different embodiments of the solution according to the invention.

The basic difference between the two embodiments is that the ERAI valve 1 is controllably opened to a particular opening angle α, on the one hand, automatically via a control circuit 3, 5, 6, 7 and, on the other hand, manually via an operating lever 11. In both cases, the ERAI valve is released or activated by pressing a push-button 12.

In FIG. 3, a control circuit 3, 5, 6, 7 of this kind is illustrated by dotted lines. In an emergency, the pilot first presses the switch or push-button 12, whereby a signal is sent to a controller 3 which causes opening of the valve 1 by the reverse actuator 6. The valve 1 is in this case opened to a position preset according to the outside temperature. The outside temperature is visible to the pilot via a display device appropriately provided in the cockpit.

In addition to the controller 3, a temperature sensor 5 and an opening angle α indicator 7 serve for automatic control to a desired cabin temperature. As shown in FIG. 3, the controller 3 receives the command to activate the reverse actuator 6 from the push-button 12, information about the valve position from the opening angle α indicator 7 and about the temperature level in the cabin 2 from the sensor 5. If, for example, the temperature drops below a particular value, the controller 3 causes the reverse actuator 6 to change the opening angle α of the valve 1 automatically, without intervention by the aircraft personnel being necessary. By changing the opening angle α of the valve 1, the cabin 2 is charged with varying amounts of outside air 4. In this way, the fresh air supply is automatically controlled as a function of the cabin temperature.

The pilot and/or the aircraft personnel additionally (illustrated in FIG. 3 by dotted lines) have the option of disabling the control circuit 3, 5, 6, 7 and manipulating the valve position manually. This can be an advantage in relation to flight safety in the event of failure of one of the components of the control circuit.

As soon as the control system of the ERAI valve 1 has been enabled by the pilot, an operating lever 11 can be activated by the pilot and/or aircraft personnel according to the temperature displayed on the sensor 5, whereby the valve 1 is opened or closed in steps or continuously by a signal sent to the reverse actuator 6, so that the desired temperature level is set. The position of the operating lever 11 is in this case preferably proportional to the opening angle α, this being achieved, for example, by designing the lever 11 as a toggle switch, slider control or rotary control. The operating lever 11 in this embodiment takes over the function of a controller, as it causes the opening or closing of the ERAI valve by the reverse actuator 6.

The reverse actuator 6 is connected to the ERAI valve via an articulation. This articulation ensures precise transmission of force of the piston of the reverse actuator 6 to the ERAI valve 1 and assures reliable swivelling of the ERAI valve about its swivel axis.

When the valve 1 is opened, outside air 4 is conducted into the cabin 2 via supply lines 9 and a distributor system 10. In particular on flights over polar regions, the cabin temperature will drop noticeably, owing to the fresh air supplied. Too steep a drop in the cabin temperature or too little oxygen supply into the cabin 2 can then be corrected by readjusting the operating lever 11.

The person skilled in the art realises that, for example in the control circuit of the automatic ERAI valve, instead of a push-button 12 an operating lever 11 can also be used. Furthermore, instead of an reverse actuator 6, some other adjusting device which is suitable for changing the opening angle α of the valve 1 could be used. It is further conceivable to make the supply of fresh air into the passenger cabin dependent on factors other than the cabin temperature. In the case of manual control of the opening angle α of the valve 1, the operating lever 11 could be electrically coupled to the temperature sensor 5, for example. The temperature sensor 5 may send an appropriate signal to a drive for the operating lever 11, which then causes swivelling of the operating lever 11. The aircraft personnel would in such a case no longer have to actuate the operating lever 11 manually. The opening angle α of the valve 1 would remain visible to the aircraft personnel because of the position of the operating lever.

In accordance with the given situations on board the aircraft, the individual components, here illustrated in FIG. 3, of the ERAI valve according to the invention can also be arranged at a different location inside the aircraft cabin 2, the cockpit or under the floor of the aircraft cabin.

The ERAI valve described here can be mounted in a simple and cost-effective manner in aircrafts equipped with ERAI valves, as no work-intensive and expensive modifications are necessary where the aircraft is concerned. Already existing components, such as, e.g. the ERAI valve with actuator, electrical lines, push-button, can continue to be used.

The invention claimed is:

1. An emergency ram air inlet valve of an aircraft, comprising:
   a control device including an actuating element for opening and closing the valve,
   a controller operatively coupled to the valve, by which the valve can be set at different open angles, and
   an operating lever located in an aircraft cabin and operatively coupled to the valve, a position of the operating lever being visible to a crew of the aircraft, and the position of the operating lever indicating the open angle of the valve,
   wherein the valve is first opened to a position preset as a function of an outside temperature outside the aircraft, and the open angle is then changed as a function of the temperature prevailing or preset in the aircraft cabin, and
   wherein the valve is in fluid communication with the aircraft cabin and extends outside the aircraft to act as a ram air inlet when set at the open angle.

2. The emergency ram air inlet valve according to claim 1, wherein the open angle can be set in steps and/or continuously.

3. The emergency ram air inlet valve according to claim 1, wherein the controller is electrically connected to an actuator, by which the open angle of the valve can be set.

4. The emergency ram air inlet valve according to claim 3, wherein the actuating element enables the actuator, and wherein the open angle of the valve can be set by the actuator via the controller.

5. The emergency ram air inlet valve according to claim 3, wherein the actuator is a mechanical actuator.

6. The emergency ram air inlet valve according to claim 5, wherein the mechanical actuator is a reverse actuator.

7. The emergency ram air inlet valve according to claim 1, wherein the open angle is set automatically via a control circuit according to a temperature prevailing or preset in the aircraft cabin.

8. The emergency ram air inlet valve according to claim 7, wherein the control circuit comprises the controller, a temperature sensor arranged in the aircraft cabin, an open angle indicator and the actuator,
   wherein the actuating element activates the actuator for opening and/or closing the valve, and the open angle can be set by the actuator via the controller as a function of the temperature detected by the temperature sensor in the aircraft cabin and the position of the valve detected by the open angle indicator.

9. The emergency ram air inlet valve according to claim 1, further comprising:
   a manual controller located in the aircraft cabin and/or in the cockpit.

10. The emergency ram air inlet valve according to claim 9, wherein the operating lever functions as the manual controller, the operating lever including at least one of a toggle switch, slider or rotary control, with which the open angle of the valve can be manually set.

11. The emergency ram air inlet valve according to claim 10, wherein the position of the operating lever is proportional to the open angle of the valve.

12. The emergency ram air inlet valve according to claim 1, wherein the actuating element is a push-button arranged in the cockpit of the aircraft.

* * * * *